Oct. 30, 1923.
C. E. MORRIS
1,472,186
DIRECTION INDICATOR FOR MOTOR VEHICLES
Filed May 8, 1920  2 Sheets-Sheet 1
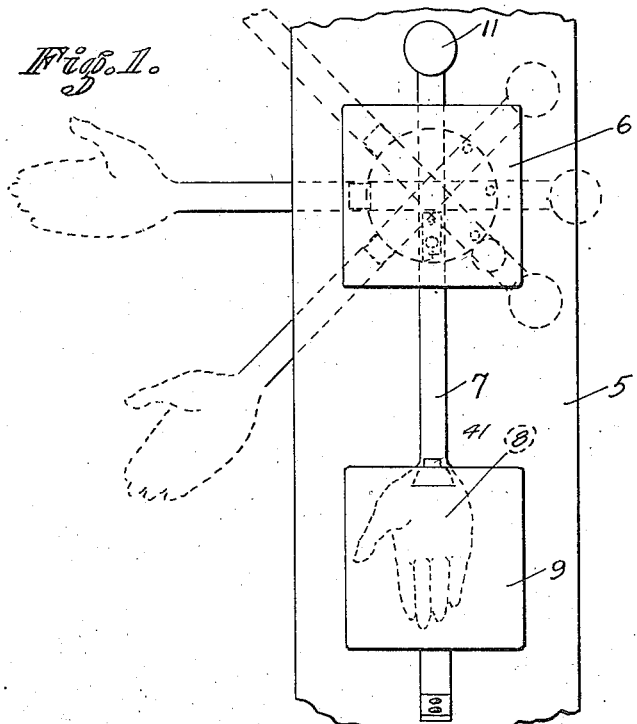
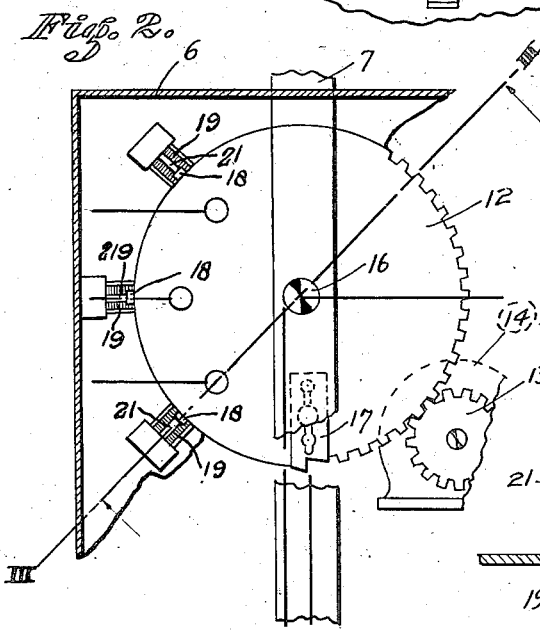
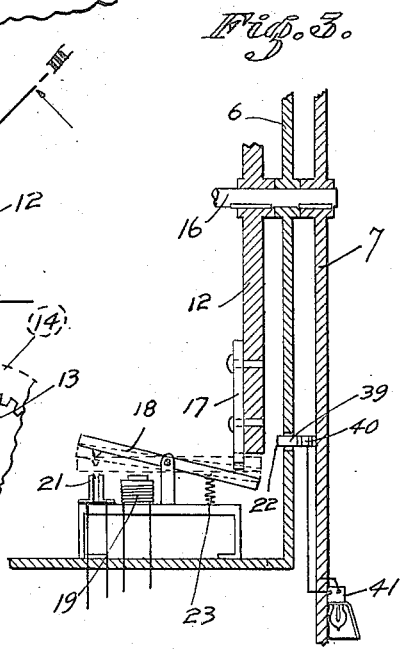
C. E. MORRIS INVENTOR.
BY *Munn & Co*
ATTORNEYS.

Oct. 30, 1923.
C. E. MORRIS
1,472,186
DIRECTION INDICATOR FOR MOTOR VEHICLES
Filed May 8, 1920    2 Sheets-Sheet 2
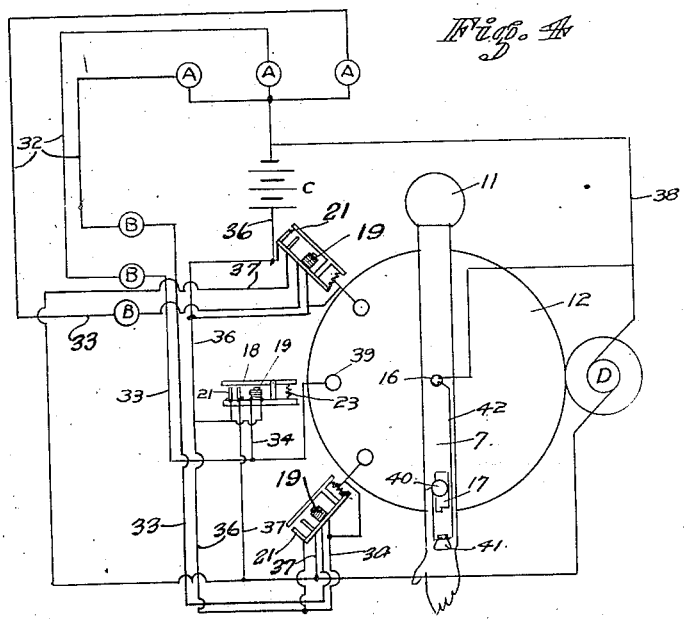
*Fig. 4*
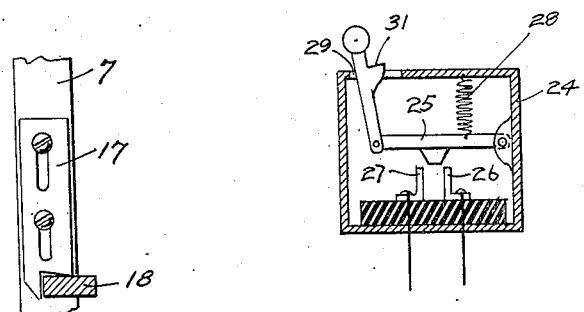
*Fig. 5.*    *Fig. 6.*
C. E. Morris
INVENTOR.
BY Munn & Co
ATTORNEYS.

Patented Oct. 30, 1923.

1,472,186

UNITED STATES PATENT OFFICE.

CARROLL E. MORRIS, OF GRIMES, CALIFORNIA.

DIRECTION INDICATOR FOR MOTOR VEHICLES.

Application filed May 8, 1920. Serial No. 379,852.

*To all whom it may concern:*

Be it known that I, CARROLL E. MORRIS, a citizen of the United States, residing at Grimes, in the county of Colusa and State of California, have invented a new and useful Direction Indicator for Motor Vehicles, of which the following is a specification.

The invention relates to a new, novel and useful improvement in automobile signals of the type adapted to be placed upon an automobile, for the purpose of indicating to a preceding or following vehicle the direction the driver intends to travel.

The principal object of this invention is to produce an automobile signal which may be operated from the steering wheel of an automobile for the purpose of manipulating a movable member, which will be visible during the day or night to a following vehicle.

Another object is to produce a mechanism, which will be positive in operation and one which may be readily applied to any standard machine.

Another object is to produce a signal which will remain in a fixed position until released.

Other objects and advantages will be seen as the description proceeds.

In the accompanying drawings: Fig. 1 is an elevation of my improved signal applied to the fender of an automobile; Fig. 2 is a detailed view partly broken away for the purpose of illustrating the driving mechanism; Fig. 3 is a cross section taken on the line 3—3 of Fig. 2; Fig. 4 is a diagrammatic view of the wiring arrangement of my signal; Fig. 5 is a detailed view of a latch mechanism; Fig. 6 is a detailed cross-sectional view of my operating switch mechanism.

Referring to the drawing more particularly, the principal moving part of my device is the gear wheel 12 mounted on the shaft 16 and rotated by means of the pinion 13 rigidly secured to the shaft of the motor 14. The shaft 16 also carries, rigidly fastened thereto, the arm 7, having at one end a hand 8 and at the other end a counterweight 11 fastened thereto, and is shown in the drawing as mounted in any part of the fender 5. A casing 6 covers the gear wheel 12 and gives further support to its shaft 16, as shown in Figure 3.

The arm 7 with the hand 8 thereon normally hangs in a vertical position, its weight outbalancing the counterweight 11. To indicate a stop, a turn to the left or a turn to the right, I swing the arm into one of the three different positions indicated in Figure 1, that is, slanting downward, horizontal, slanting upward, by causing the motor to rotate the gear wheel until those respective stations are reached. At each of these stations there is pivotally mounted in the casing a lever 18, which, when horizontal, just clears the gear wheel 12. It is normally held slanting, however, by means of a spring 23, which removes the lever further from the gear wheel and allows it to even clear the latch 17 rigidly secured to the gear wheel 12 and extending a short distance beyond its circumference. Thus it will be seen that normally none of the levers 18 would interfere with the rotation of the gear wheel 12. But it will be noted that each lever 18 is adapted to be acted on by an electromagnet 19, which, when energized, will force the lever into a horizontal position against the tension of the spring 23. When in this position the lever closes a circuit at 21 (Figure 3) and is also ready to oppose any advance of the latch 17 beyond its station. The device will then lend itself to the following operation, always keeping in mind that each of the three stations is equipped with the lever 18, the electromagnet 19 and the switch 21:

First one of the electromagnets 19 is energized by a pressure on one of three switch buttons, hereinafter described, on the steering wheel. The electromagnet attracts its lever bar 18, forcing the same into a horizontal position, thereby closing the circuit at 21 and obstructing an advance of the latch 17 beyond its station. The closing of the circuit sets in motion the motor 14 and with it the gear wheel 12. The latter will rotate, carrying with it the arm 7, until the latch 17 strikes the one horizontally disposed lever bar 18. It will be seen from Figure 5, that the striking part of the latch 17 is a sloping tooth. In striking the lever 18 the sloping surface of the tooth will force the lever downward, thereby breaking the circuit at 21 and stopping the motor. It will be remembered that this still leaves the electromagnet energized so that it still has the power to pull down on the lever bar against the tension of the spring 23. As soon, therefore, as the lever bar passes the point of the tooth of latch 17, which latter is advanced slightly even if the circuit is broken due to the momentum of the gear wheel, the electromagnet will force the spring arm of the lever up again, until the same strikes the body of the latch 17, as shown in Figure 5. This position of the lever bar 18 is a medium one as compared with the horizontal position and the extreme sloping position and in this position it locks the gear wheel 12 without closing the circuit of 21. From this position it can be released only by a demagnetizing of the electromagnet, that is, by a release of the switch on the steering wheel, when the spring 23 will draw the lever bar 18 to its extreme sloping position, in which it clears the latch altogether.

A section through the switch box on the steering wheel is shown in Figure 6. Keeping in mind that each station has its switch, it will be seen, that the box 24 has three levers 25 pivoting on a shaft secured near one of the walls of the box, each lever being provided with a contact adapted to close a circuit at 26 and 27. A spring 28 draws up on the lever and from the end of the lever an arm, pivoting on the lever, extends upward through a slot 29 in the top of the switch box. Bearing down on the lever will engage the contact 25 with 26 and 27 and the lip 31 is adapted to lock the switch by engaging the top of the box. Since the circuit of which this switch is a part, is the one that energizes the electromagnet above referred to, it will be seen that the driver can at any time move the indicating arm to any of the three positions by pressing on the switch, and that the arm will stay in that position, until the switch is released, that is, until the electromagnet has been demagnetized at which time the arm will drop back by its own weight.

Since it is desirable, especially at nighttime to have the indicator illuminated, I provide a lamp 41 on the indicating hand, as shown in the wiring diagram of Figure 4, one wire of which leads to the main circuit and the other to the contact 40. Three contacts 39 are provided on the top of the casing 6 so that each time the indicator stops at one of the stations the circuit is closed. In a similar way the three lamps A on the dash-board are included in the circuit.

The wiring diagram in Figure 4 shows the wiring necessary for my device, only one complete circuit being represented. B is the switch on the steering wheel, C the battery and D the motor. Pressing the switch B causes the current to flow from the battery C through the wire 36 to the shunt 34 enclosing the electromagnet 19, thence through wires 34, 33 and 32 and the dashlight A back to the battery. After the electromagnet has closed the circuit at 21 the main current will flow as follows: from the battery C through the wire 36, the contact at 21, the wire 37, the motor D, the wire 38, back to the battery C. As soon as the contact is broken at 21 the full current will return to its path through the electromagnet as first described.

I claim:

1. In a direction indicator, a motor having a pinion thereon, a motor circuit, a pivoted indicating signal normally hanging down having a gear wheel associated therewith engaging the pinion, a latch member on the gear wheel and a switch in the motor circuit including a lever extending with its rear end into the path of the latch member, the latter having an inclined face for depressing the lever while passing the same whereby the switch is opened.

2. In a direction indicator, a pivoted indicating signal normally hanging down having a gear wheel associated therewith for operating the same, a motor having a pinion thereon engaging the gear wheel, a motor circuit, a latch member on the gear wheel, a switch in the motor circuit, including a lever extending with its rear end into the path of the latch member, a manually controlled electromagnet for closing the switch and an inclined tooth on the latch member for depressing the lever while passing the same, whereby the motor switch is opened allowing the lever to be returned to a midway position by the electromagnet after it has passed the tooth and to catch behind the same for preventing the dropping back of the signal as long as the electromagnet remains energized.

3. In a direction indicator, a pivoted indicating signal normally hanging down, a motor for swinging the same in an active position, a lever switch for the motor circuit, a manually controlled electromagnet for closing the switch and means associated with the signal for opening the switch when an active position has been reached allowing the switch lever to be returned thereafter to a midway position by the electromagnet and to catch behind said means for preventing the dropping back of the signal as long as the electromagnet remains energized.

CARROLL E. MORRIS.